United States Patent [19]

Garrett et al.

[11] Patent Number: 5,437,584
[45] Date of Patent: Aug. 1, 1995

[54] TWO-SPEED CONVERTER

[75] Inventors: Roy J. Garrett, deceased, late of Redford Township, Mich.; James L. Garrett, legal representative, Colorado Springs, Colo.

[73] Assignee: Ford Motor Company, Dearborn, Mich.

[21] Appl. No.: 42,181

[22] Filed: Apr. 2, 1993

[51] Int. Cl.⁶ .............................. F16H 59/04
[52] U.S. Cl. ...................... 475/275; 475/59; 475/276
[58] Field of Search ............ 475/269, 275, 276, 280, 475/311, 312, 326, 330, 59

[56] References Cited

U.S. PATENT DOCUMENTS

| | | | |
|---|---|---|---|
| 2,869,398 | 1/1959 | De Ford | 475/47 |
| 3,000,235 | 9/1961 | Simpson | 475/280 |
| 3,277,746 | 10/1966 | Forester et al. | 475/59 |
| 3,296,891 | 1/1967 | Tuck | 475/36 |
| 3,835,732 | 9/1974 | Mori et al. | 475/276 |
| 4,018,106 | 4/1977 | Uozumi et al. | 475/56 |
| 4,117,745 | 10/1978 | Yokoyama et al. | 475/53 |
| 4,123,952 | 11/1978 | Wayman | 475/312 |
| 4,140,029 | 2/1979 | Lee | 475/35 |
| 4,398,436 | 8/1983 | Fisher | 475/47 |
| 4,455,890 | 6/1984 | Kuramochi et al. | 475/312 |
| 5,157,608 | 10/1992 | Sankpal et al. | 74/866 |
| 5,334,112 | 8/1994 | Nogle et al. | 475/59 |

FOREIGN PATENT DOCUMENTS 60-205065  10/1985  Japan .

*Primary Examiner*—John J. Vrablik
*Attorney, Agent, or Firm*—Roger L. May; Frank G. McKenzie

[57] ABSTRACT

A transmission for a vehicle having multiple ratio gearing, a hyrdokinetic unit with a turbine and impeller, a lock-up clutch in said hydrokinetic unit, an auxiliary gear unit having a torque input element connected to the turbine and torque output element connected to the gearing, engagement and release of the lock-up clutch effecting shifting of the speed ratio of the transmission.

7 Claims, 5 Drawing Sheets

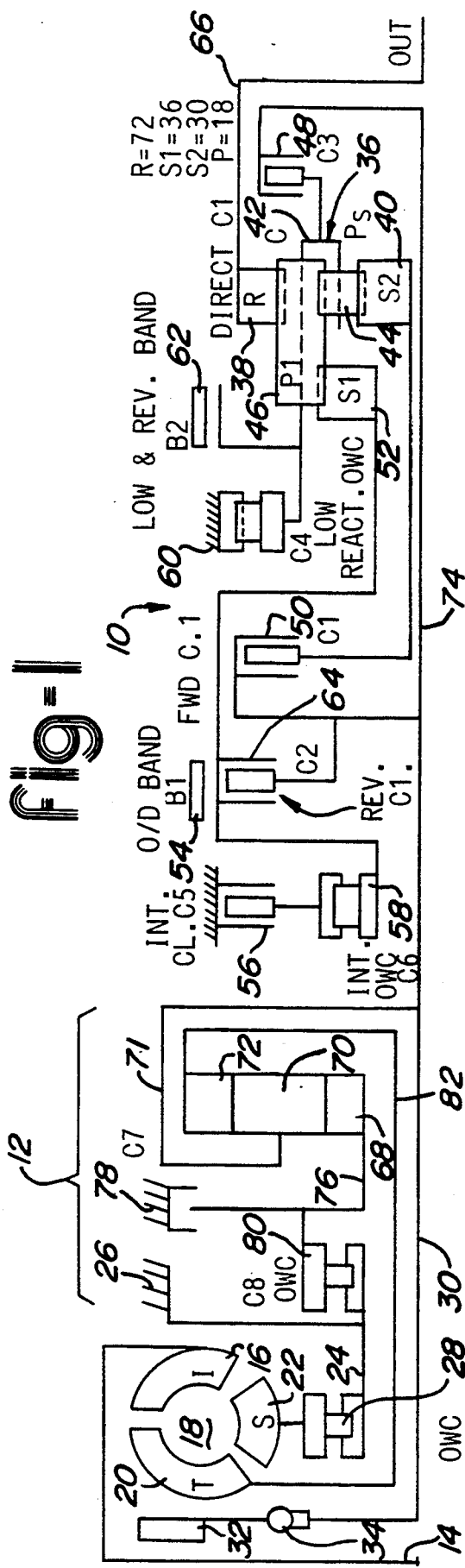

| GEAR | C11 | C12 | C13 | C14 | B1 | B2 | DRIVE | | COAST | |
|---|---|---|---|---|---|---|---|---|---|---|
| | | | | | | | OWC1 | OWC2 | OWC1 | OWC2 |
| 1M | X | | X | | X | X | | | | X |
| 1D | X | | | | X | X | | O/R | | |
| 2 | X | X | | | X | | O/R | | O/R | |
| 3 | | X | X | | | | | X | X | |
| 4 | | X | X | X | | | | O/R | | O/R |
| R | X | | | X | | X | | | | X |

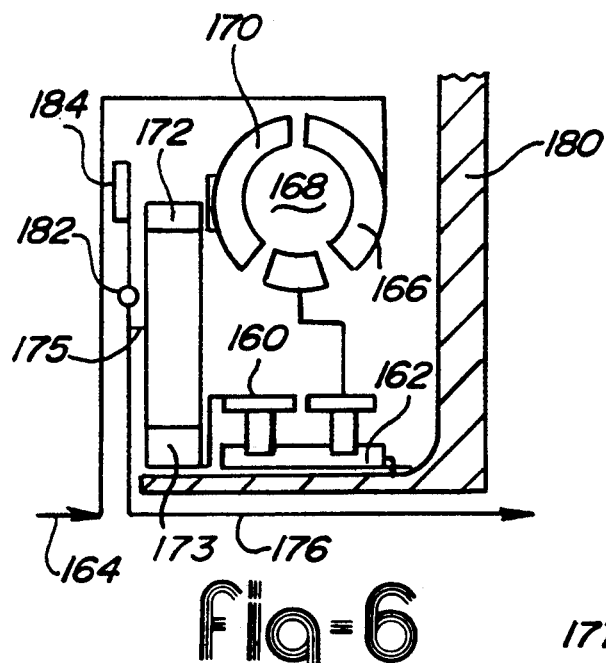
fig-6
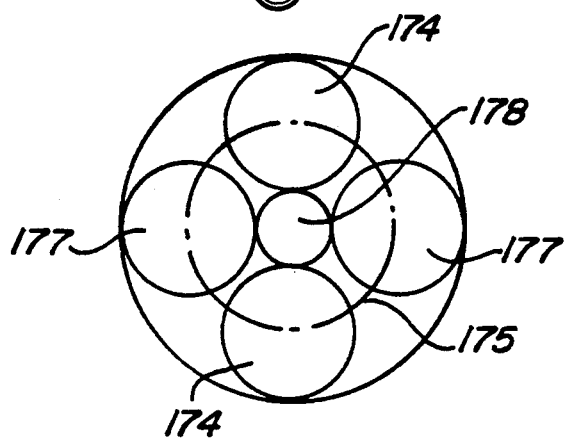
fig-7
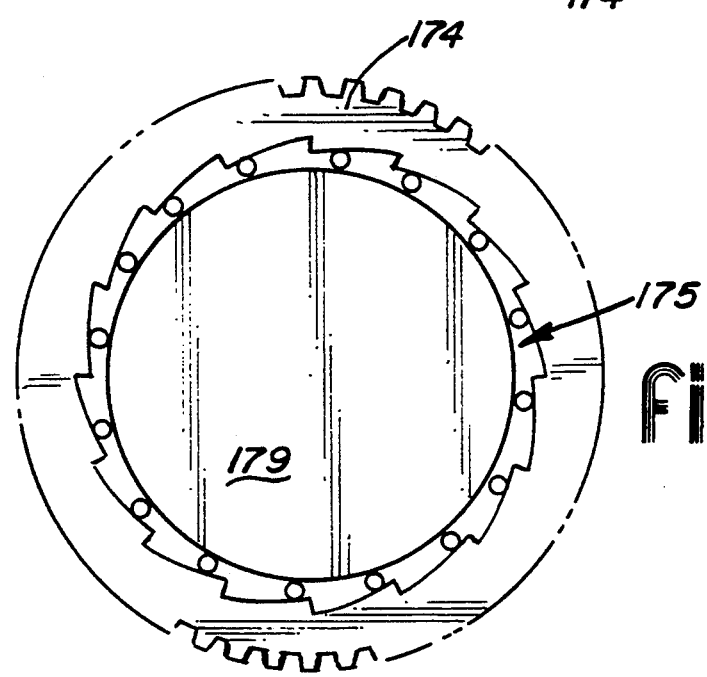
fig-7a

TWO-SPEED CONVERTER

TECHNICAL FIELD

This invention relates to an automotive power transmission mechanism having a torque converter with a bypass clutch that may be engaged and released to bypass the converter and to provide additional gear ratios.

BACKGROUND OF INVENTION

Automatic transmissions for automotive vehicles usually include hydrokinetic torque converters and multiple ratio planetary gearing. An example of such an automatic is disclosed in U.S. Pat. No. 5,157,608, which is assigned to Ford Motor Company, assignee of this invention.

Automatic transmissions of this kind generally include a hydraulic control valve system having clutch and brake servos which control relative motion of the planetary gear elements of the transmission. The clutch and brake servos establish selectively multiple torque flow paths of differing ratios as engine torque is delivered to the vehicle traction wheels.

The hydrokinetic torque converter is located between the engine and torque input planetary gear elements of the transmission. The torque converter multiplies engine torque during vehicle acceleration and acts as a hydrokinetic coupling during steady state operation. A lock-up clutch is provided to bypass the converter during steady state operation in the highest speed ratio of a range of ratios selected by the operator, which includes an overdrive ratio. The vehicle operator may select either of two automatic shift drive ranges, drive range "3" and overdrive range "4". The disclosure of U.S. Pat. No. 5,157,608 is incorporated herein by reference to supplement the disclosure of the structure and operation of an automatic transmission and control system capable of embodying the improvements of the present invention.

SUMMARY OF INVENTION

According to the invention, a two-speed converter is provided by an auxiliary planetary gear set located between the converter and the speed change gears of the transmission.

According to another aspect of the invention, an auxiliary planetary gear set is driven by the turbine of the torque converter. One planetary gear element of the auxiliary gear set is connected through a one-way clutch to a stationary reaction element.

Two functions are provided by the converter lock-up clutch of the invention. A first function is to provide a torque flow bypass for the hydrokinetic impeller and turbine elements after the converter reaches its coupling point. A second function is to provide an automatic downshift through the auxiliary gear set when the lock-up clutch is released and the converter acts as an open converter. The automatic downshift function results in a smooth ratio downshift because of the half-ratio step between two adjacent transmission ratios in the speed change gear set. The torque flow bypass, furthermore, provides improved fuel economy and reduced emissions during steady-state operation.

According to another aspect of the invention, a hydrokinetic torque converter transmission with a lock-up clutch forms a part of the clutch and brake arrangement for the main planetary gearing. Engagement of the converter clutch causes a torque flow bypass of the converter. An overrunning coupling for the reaction member of the auxiliary planetary gear set is preferably added to the planetary gear set to make the ratio shift non-synchronous.

It is an objective of the invention to provide engine braking in all gear ratios.

It is another objective to provide a two-speed converter wherein an open converter condition gives low range operation and a locked-up or economy condition provides high range operation.

The invention provides better utilization of torque by doubling the number of gear selections available. An advantage of the invention is the non-synchronous upshift that is available for each of the ratios provided by the main gearing.

According to another aspect of the invention, the bypass clutch performs three functions: (i) the clutch locks-up the engine to the transmission; (ii) the clutch applies engine braking; and (iii) the clutch shifts the transmission from low to high for each ratio of the main gearing when the clutch engages.

The objects and advantages of the invention can be achieved without requiring basic control changes and is adaptable to many transmissions presently known in the art.

Finally, it is an object of the invention to provide a system wherein an increased number of gear ratio ranges is provided relative to the ratios that are provided by the main gearing, thus causing so-called half-step shifts and improving drivability.

Improved performance is achieved by providing half-step down shifting as the bypass clutch is released and the converter opens. This results in smoother down shifting. The two-speed converter makes it possible also to have two complete ranges of gear ratios.

BRIEF DESCRIPTION OF THE DRAWINGS

FIG. 1 is a schematic diagram of a hydrokinetic, multiple ratio rear wheel drive transmission for a vehicle incorporating the two-speed converter of my invention;

FIG. 2 is a chart that shows the clutch and brake engagement and release pattern for the transmission schematically illustrated in FIG. 1;

FIG. 6 is a schematic diagram of a two-speed converter for a hydrokinetic, multiple ratio transmission having a one-way clutch built into the carrier to provide engine braking;

FIG. 7 is a diagrammatic drawing of a planetary gear set including a pair of one-way clutch gears as part of the planetary gear set for the embodiment of FIG. 6.

FIG. 7a is a schematic view of a one-way clutch gear on a carrier for the embodiment of FIG. 6.

BEST MODE FOR CARRYING OUT THE INVENTION

Figure 3:
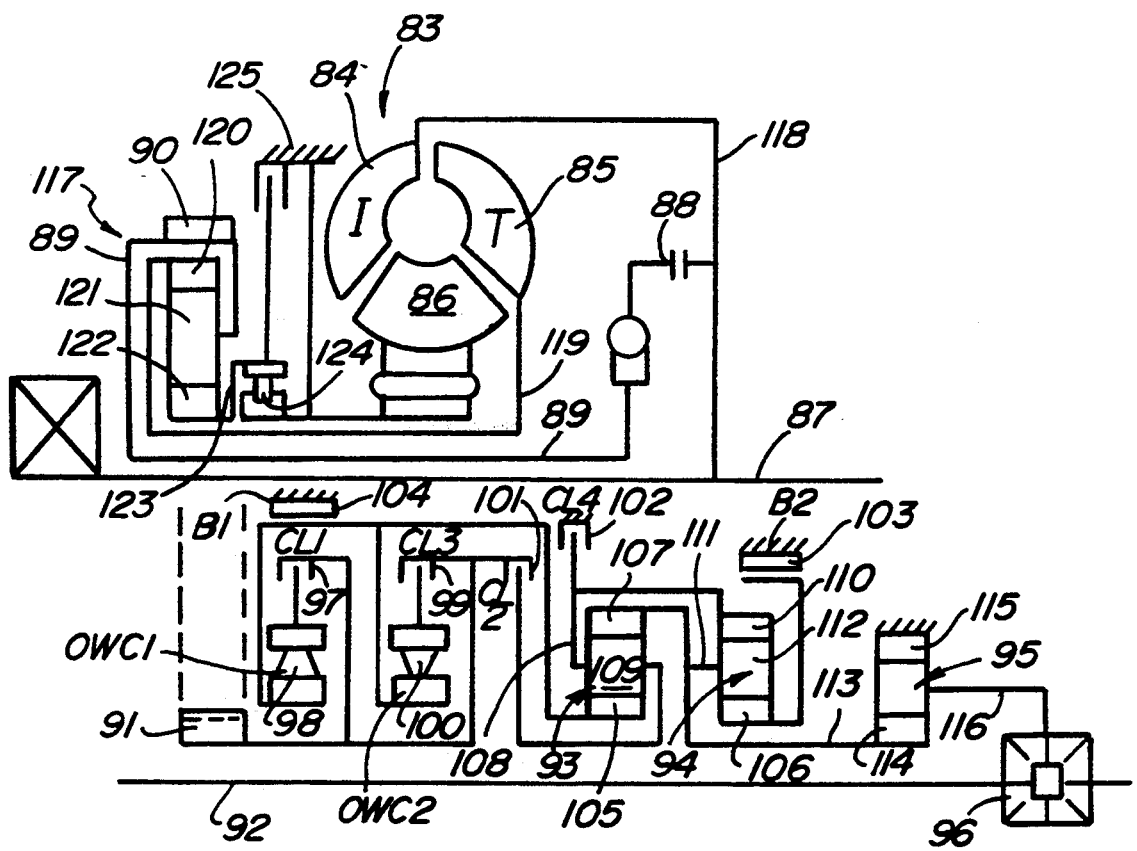
FIG. 3 is a schematic diagram of a hydrokinetic, multiple ratio front wheel drive transmission for a vehicle incorporating the two-speed converter of the invention.

The invention may be practiced in many forms and is applicable to rear wheel drive vehicle transmissions, as well as transversely oriented front wheel drive transmissions. FIG. 1 shows an example of a rear wheel drive transmission 10 including a two-speed converter section 12.

In the chart of FIG. 2, the clutch and the brake engagement and release pattern is indicated. The symbol X is used to define an engaged clutch or brake. The first gear includes a manual mode, as shown, when the transmission selector lever is in the position and a second mode when the transmission selector lever is in the overdrive, four-ratio range position. In the second row of the chart, second gear is also shown to have two modes, depending upon the location of the transmission selector. Third, fourth and reverse gear ratios are also shown on the chart.

In the chart of FIG. 2, only the standard gear ratios are presented. According to the invention, the following expanded range gear ratios may be provided by the addition of two-speed converter section 12:

| GEAR | LOW-RANGE OPEN CONVERTER | HIGH-RANGE LOCKED-UP CONVERTER | PERCENTAGE REDUCTION |
|---|---|---|---|
| 1L | 2.92 | | 82 |
| 1H | | 2.40 | 74 |
| 2L | 1.79 | | 82 |
| 2H | | 1.46 | 83 |
| 3L | 1.22 | | 82 |
| 3H | | 1.0 | 81 |
| 4L | 0.812 | | 82 |
| 4H | | 0.667 | — |
| Rev. | −2.44 | | |

Referring again to FIG. 1, numeral 14 designates the crankshaft of an internal combustion engine. Crankshaft 14 is connected to the impeller 16 of a hydrokinetic torque converter 18. The converter 18 also includes a bladed turbine 20 and a bladed stator 22. The bladed stator 22 is located between the torus flow outlet section of the turbine 20 and the torus flow inlet section of the impeller 16. The stator 22 is supported by a stationary sleeve shaft 24, which is connected to the transmission housing shown diagrammatically by reference numeral 26. A one-way clutch 28 is situated between the bladed section of the stator 22 and the stationary sleeve shaft 24. One-way clutch 28 permits freewheeling motion of the stator 22 in the direction of rotation of the impeller 16, but it prevents rotation in the opposite direction.

Shaft 30 is connected to a clutch disc of bypass clutch 32 by means of a damper 34. Bypass clutch 32 is situated between the damper 34 and the shaft 30. Shaft 30 provides a driving connection between the turbine and multiple ratio gearing disposed about the axis of shaft 30. Shaft 30 is aligned with the engine crankshaft 14.

The multiple ratio gearing comprises a Ravagineaux gear set 36. Gear set 36 includes a ring gear 38, sun gear 40, a planetary carrier 42 and multiple planet pinions 44 and 46 journalled on planetary carrier 42 so that they mesh with the ring gear 38 and sun gear 40 respectively. They also mesh with each other.

Planetary carrier 42 is connected through $C_3$ clutch 48 to the shaft 30. Sun gear 52 is adapted to be connected to the shaft 30 by $C_1$ clutch 50.

Sun gear 52 engages planetary pinion 46 and is braked by $B_1$ overdrive band 54. Sun gear 52 may also be connected to $C_5$ clutch 56 and $C_6$ one-way clutch 58. $C_5$ clutch 56 grounds sun gear 52 to the housing. Planetary carrier 42 may be grounded through $C_4$ one-way clutch 60. Planetary carrier 42 may also be anchored by low and reverse $B_2$ overdrive band 62 and reverse $C_2$ clutch 64 is adapted to connect sun gear 52 to shaft 30. Ring gear 38 drives output shaft 66.

For a description of the mode of operation of the transmission, reference may be made to U.S. Pat. Nos. 5,157,608; and 5,516,575, the disclosures of which are hereby incorporated by reference.

Use of a bypass clutch to engage and disengage the auxiliary gear set of the two-speed section 12 shown in FIG. 1 now will be described.

Two-speed section 12 includes a sun gear 68, which is connected to ring gear 72 by planetary gears 70 on carrier 71. Carrier 71 is connected to output shaft 74. Sun gear 68 is connected by shaft 76 to $C_7$ coast disc brake 78 or is grounded through $C_8$ one-way clutch 80 and sleeve shaft 24, to the housing.

In the open converter, torque multiplying operating mode, torque is delivered from the crankshaft 14 to the impeller 16. Torque is developed in bladed turbine 20 and output shaft 82 which drives the ring gear 72. Reaction torque sun gear 68 is transferred through shaft 76 and $C_8$ one-way clutch 80, which is locked to the housing as shown diagrammatically by reference numeral 26.

In the lock-up condition of the two-speed section 12, bypass clutch 32 locks the crankshaft 14 to the shaft 30. Shaft 30 transmits torque to shaft 30 and the carrier 71 for planetary gears 70 rotates with shaft 30 thus deactivating turbine 20 as one-way clutch 80 free-wheels. Sun gear 68 is grounded to the housing by coast $C_7$ brake if coast braking is desired.

Shown in FIG. 3 is a schematic cross-sectional view of the torque converter and planetary gearing of a transaxle, including a two-speed converter made in accordance with this invention. The transaxle includes a torque converter 83 having a bladed impeller 84, a bladed turbine 85 and a bladed stator 86 arranged in a toroidal fluid flow circuit. The torque converter 83 is drivably connected to an engine crankshaft 87.

A by-pass clutch assembly 88 is adapted to establish a mechanical torque flow path between the impeller 84 and carrier 89. The carrier 89 is connected drivably to a driving sprocket 90 of a torque transfer chain drive, which includes a drive chain and a driven sprocket 91 located on the axis of a torque output shaft 92.

The planetary gear units for the transaxle comprise a first simple planetary gear unit 93 and a second simple planetary gear unit 94. A final drive gear unit 95 is located on torque output side of the planetary gear units between the gear units and a differential gear assembly 96.

The speed ratios achieved by the two simple planetary gear units are controlled by CL1 clutch 97, a low ratio overrunning coupling 98, CL3 direct clutch 99, a direct overrunning coupling 100, CL2 intermediate clutch 101, and CL4 reverse clutch 102. In addition to the clutches and the overrunning couplings, there are two friction brakes; i.e., B2 low-and-intermediate brake band 103 and B1 overdrive brake band 104.

Fluid pressure operated brake servos apply and release brake band 102 and overdrive brake band 104. The overdrive servo comprises a cylinder and a servo piston which define a pressure chamber which, when pressurized, applies brake band 104, thereby anchoring sun gear 105 for the planetary gear unit 93.

Low-and-intermediate brake band 103 is applied and released by a brake servo comprising a cylinder and a double-acting piston located within the cylinder which engages the brake band 103, thus anchoring sun gear 106 for gear unit 94.

Gear unit 93 comprises, in addition to the sun gear 105, a ring gear 107, a carrier 108 and planetary pinions 109 journalled on the carrier 108. Pinions 109 mesh with the ring gear 107 and sun gear 105.

Gear unit 94 comprises, in addition to sun gear 106, ring gear 110, carrier 111 and planet pinions 112 journalled on the carrier 111.

Ring gear 107 of the gear unit 93 is connected drivably to carrier 111 which, in turn, is connected to output shaft 113 which delivers torque directly to sun gear 114 of the final drive gear unit 95. Ring gear 115 of the gear unit 95 is connected to and anchored by the transmission housing. Carrier 116 of gear unit 95 is connected directly to the carrier of differential housing 96.

Forward clutch 97, the direct clutch 99, the intermediate clutch 101 and the reverse brake 102 are actuated by their respective servo pistons which are received in servo cylinders and which define pressure working chambers which energize multiple friction discs. In each instance, a piston return springs acts on the piston to oppose the fluid pressure force of the working pressure.

Figures 4, 5:
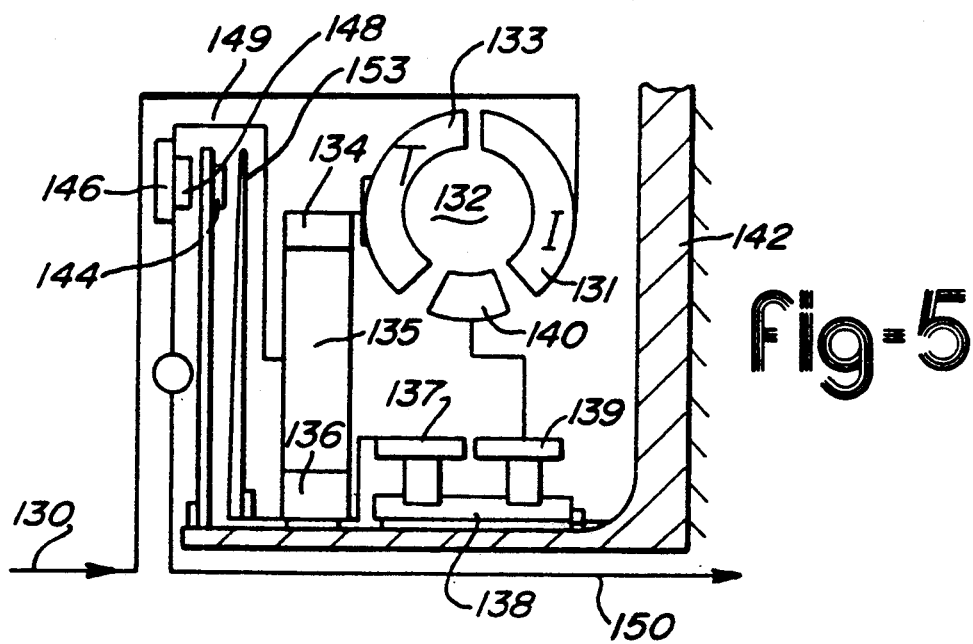
FIG. 4 is a chart that shows the clutch and brake engagement and release pattern for the transmission schematically illustrated in FIG. 3.
FIG. 5 is a schematic diagram of an alternative embodiment of a two-speed converter for a hydrokinetic, multiple ratio transmission.

The chart of FIG. 4 shows the clutch and brake engagement and release pattern for the clutches and the brakes. For purposes of correlating the schematic representation of FIG. 3 with the chart of FIG. 4, the forward clutch 97 is identified in FIG. 4 by the symbol CL1; the direct clutch 99 is identified in FIG. 4 by the symbol CL3; the intermediate clutch 101 is identified in FIG. 4 by the symbol CL2; the reverse brake 102 is identified in FIG. 4 by the symbol CL4; the low-and-intermediate brake 103 is identified in FIG. 4 by the symbol B2; and the overdrive brake band 104 is identified in FIG. 4 by the symbol B1. Further, the forward over-running coupling 98 is identified in FIG. 4 by the symbol OWC1 and the direct over-running coupling 100 is identified in FIG. 4 by the symbol OWC2.

The gear ratios which may be obtained with the gearing of FIG. 3 are listed below in the following table:

| GEAR | LOW-RANGE OPEN CONVERTER | HIGH-RANGE LOCKED-UP CONVERTER | PERCENTAGE REDUCTION |
| --- | --- | --- | --- |
| 1L | 3.46 | | 80 |
| 1H | | 2.771 | 70 |
| 2L | 1.93 | | 80 |
| 2H | | 1.543 | 81 |
| 3L | 1.25 | | 80 |
| 3H | | 1.00 | 87 |
| 4L | 0.868 | | 80 |
| 4H | | 0.694 | |
| Rev. | −2.83 | | |

The corresponding clutch or brake that is applied to achieve any gear ratio is identified in FIG. 4 by the symbol X. In the case of the over-running couplings, the engaged state of the over-running coupling is identified in FIG. 4 by the symbol X; and the over-running state is identified by the symbol O/R, which is an over-running condition.

To obtain the low-speed driving ratio, clutch CL1 is applied, as indicated in FIG. 4. If coast braking is desired in low ratio, direct clutch CL3 is applied. On the other hand, if the transmission is in the normal driving mode, with a full range of ratios, clutch CL3 is not applied in low or intermediate ratio. No braking torque then is available since over-running coupling OWC2 transmits torque reaction in only one direction.

Low-and-intermediate brake band B2 is applied in low ratio, thereby anchoring sun gear 106 which serves as a reaction point. The torque on the driven sprocket 91 thus is transferred through the forward clutch CL1 to the sun gear 105. A split torque delivery path, therefore, occurs through gear unit 93 as the carrier 108 drives a ring gear 110 which, in turn, delivers torque to the carrier 111 and the output shaft 113.

A ratio change from the low-speed ratio to the intermediate speed ratio is achieved by engaging clutch CL2. This causes over-running coupling OWC1 to freewheel as torque is transferred through the engaged clutch 101 to the carrier 108. A ratio change from the intermediate ratio to the direct drive ratio is achieved by engaging clutch CL3 as clutch CL1 is released. Clutch CL2 remains applied so all of the elements of the gear units rotate together in unison with a one-two-one ratio.

Overdrive ratio is achieved by continuing to release clutch CL1, by continuing to apply clutch CL2, and by continuing to apply clutch CL3 as the overdrive brake band B1 is applied. Since the sun gear 105 is anchored by the overdrive brake band, the ring gear 107 and the output shaft 113 are overdriven. Over-running coupling OWC2 free-wheels during overdrive.

Reverse drive is achieved by engaging simultaneously clutch CL1 and reverse brake CL4. Clutches CL2, CL3 and brake B1 are released. Torque of the driven sprocket 91 is then transferred through the clutch CL1 and the over-running coupling OWC1 to the sun gear 105. Since carrier 108 is anchored by the reverse brake CL4, ring gear 107 is driven in a reverse direction together with output shaft 113.

The two-speed converter 117 has an open, torque multiplying mode wherein crankshaft 87 provides input torque through impeller housing 118, which transfers torque to the blades of the impeller 84. Torque is then transmitted through the hydrokinetic torque converter 83 to the turbine 85. The turbine 85 is connected to shaft 119 which, in turn, drives ring gear 120. Planetary gears 121 connect the ring gear 120 and sun gear 122. Sun gear 122 provides reaction torque through the shaft 123 which engages one-way clutch 124. One-way clutch 124 is grounded to the housing at 125.

In the locked-up condition, bypass clutch 88 causes torque to be transmitted directly to sleeve shaft 89 and the driving sprocket 90, which drives the driven sprocket 91 by means of a drive chain.

Referring now to FIG. 5, a two-speed section with engine braking for the converter is shown. In high range, engine braking is provided directly through bypassing the converter.

In the open torque multiplying converter mode, torque is transferred from crankshaft 130 to the impeller 131 through the hydrokinetic torque converter 132 to the turbine 133. Turbine 133 is connected to the ring gear 134. Planetary gears 135 connect ring gear 134 to sun gear 136. Carrier 149 drives shaft 150. Sun gear 136 is connected through one-way brake 137 to the stationary sleeve shaft 138. One-way brake 137 and stator brake 139 are both grounded to the housing, shown diagrammatically at 142.

Sun gear 136 is also adapted to be connected to and grounded to housing 142 by coast clutch 144 in the coast mode. Needle thrust bearing 148 carried by clutch disc 146 applies frictional engagement force against brake disc 153.

In the lock-up mode, the crankshaft 130 drives the impeller 131 of the hydrokinetic torque converter 132. The turbine 133 drives ring gear 134. Bypass clutch 146 provides torque through shaft 150 to the chain of FIG. 3 or input shaft of multi-ratio gear set of FIG. 1.

Referring now to FIG. 6, a two-speed gear unit with a one-way clutch 160 built into the converter stator shaft 162 is shown. Torque is provided by the crankshaft 164, which drives the impeller 166. Hydrokinetic torque converter 168 develops a torque that drives the turbine 170. Turbine 170 is connected to the ring gear 172. Carrier 175 journals pinion 177, which engage ring gear 172 and sun gear 173.

Ratchet gears 174 also engage ring gear 172 and sun gear 173. The open converter, torque-multiplying mode causes torque to be delivered through carrier 175 to the output shaft 176. Reaction torque is provided by the sun gear 173, which is grounded to the housing 180 by the one-way clutch 160 and shaft 162. Clutch 160 is not able to provide coast braking. Coast braking torque can be delivered, however, through the ratchet gears 174. The operation of ratchet gears 174 will be explained more fully below with reference to FIGS. 7 and 7a.

In the lock-up mode, the shaft 176 is connected through bypass clutch 184 and damper 182 directly to the crankshaft 164.

A carrier, including a built-in one-way clutch, is shown diagrammatically at 175. Less axial space is required for this embodiment because engine braking is provided through the one-way clutch in the carrier 175. The ring gear teeth engage two one-way clutch gears 174 and two carrier pinions 177. One-way clutch gears 174 and carrier pinions 177 engage sun gear 178. One-way clutch ratchet gears 174 preferably have 44 teeth, sun gear 178 preferably has 29 teeth and ring gear 172 preferably has 116 teeth.

One-way clutch, or ratchet gear 174 engages non-rotating pin 179, shown in FIG. 7a, for the carrier 175. The pin 179 retains the one-way clutch gear 174. Ratchet gear 174 also engages the ring gear 172 so that reverse torque locks the ratchet gear and torque is transferred to the ring gear 172. Pin 179 does not rotate relative to carrier 175.

Figure 8:
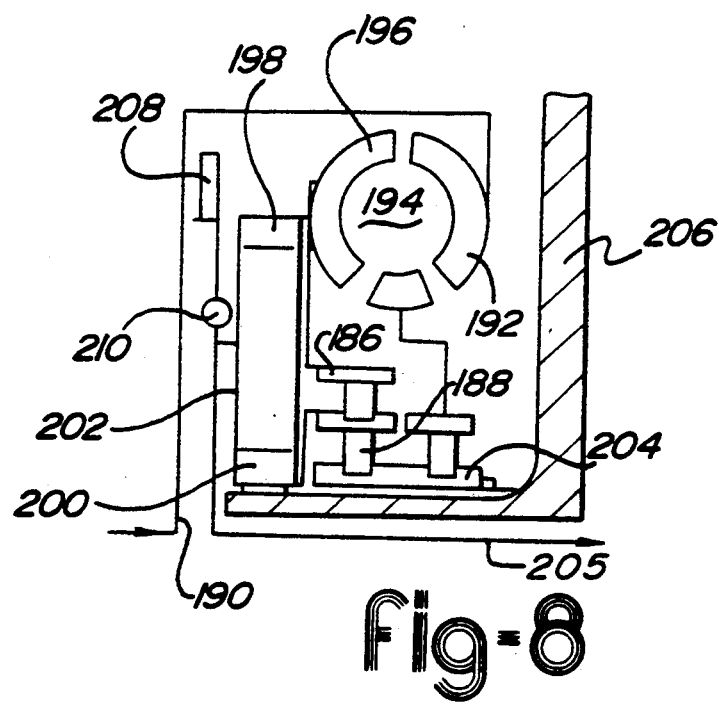
FIG. 8 is a schematic diagram of a two-speed converter for a hydrokinetic, multiple ratio transmission having stacked one-way clutches.

Referring now to FIG. 8, a two-speed unit with stacked one-way clutches 186 and 188 is illustrated. Torque is provided by a crankshaft 190 to the impeller 192 and is transferred through the hydrokinetic torque converter 194 to the turbine 196. Turbine 196 is connected to the ring gear 198.

In the open and multiplying mode, the sun gear 200, which is connected to the ring gear 198 by planetary gears 202, provides reaction torque through the stacked one-way clutches 186 and 188 to the stationary shaft 204. Shaft 204 is grounded to the housing 206.

In the lock-up mode, the output shaft 205 is connected to the crankshaft 190 by bypass clutch 208 and damper 210. One-way clutch 188 free-wheels.

Figure 9:
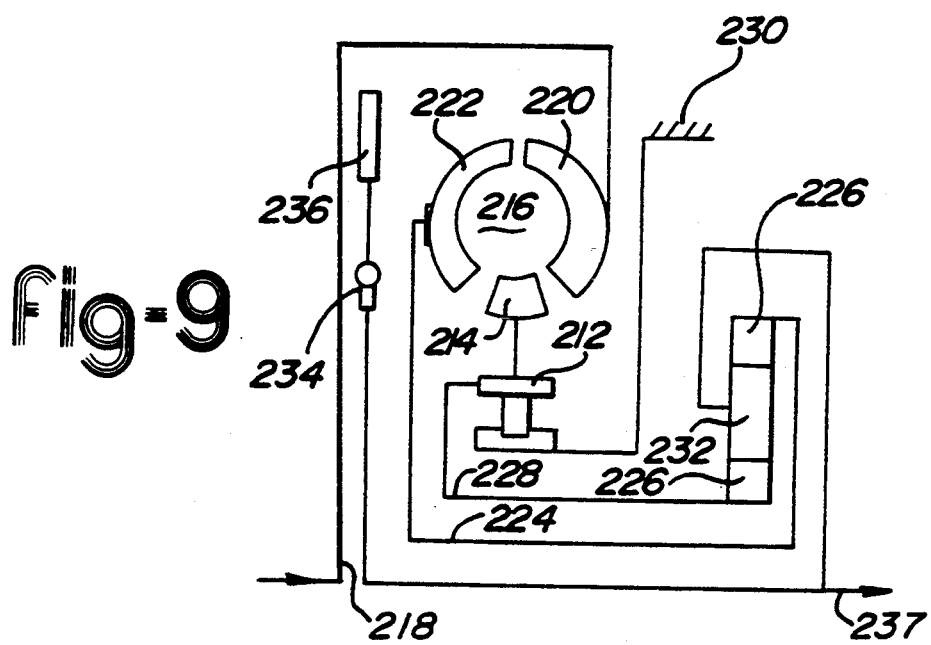
FIG. 9 is a schematic diagram of a two-speed converter for a hydrokinetic, multiple ratio transmission having a single one-way clutch.

Referring now to FIG. 9, a two-speed unit with a sun gear reaction clutch 212 is illustrated. The clutch 212 is connected to the stator shaft 214 of a hydrokinetic torque converter 216. Crankshaft 218 is connected to the impeller 220 of the hydrokinetic torque converter 216 which, in turn, drives the turbine 222. Turbine 222 is connected to the sleeve shaft 224 and to the ring gear 226.

In the open torque multiplying mode, reaction torque is provided by clutch 212, which is connected to sun gear 226 through a sleeve shaft 228 and to the housing at 230.

In the lock-up mode, the crankshaft 218 is connected by bypass clutch 236 and damper 234 to output shaft 237. The planetary gears 232 in the lock-up mode are locked to the crankshaft along with the ring gear 226, which is locked via the hydrokinetic torque converter 216.

The above description is intended to exemplify several embodiments of the present invention and is intended to be illustrative of the concept and not limiting. The broad scope of the applicant's invention should be construed in light of the following claims.

It is claimed:

1. A hydrokinetic, multiple speed ratio transmission for a vehicle with an engine and traction wheels comprising a bladed turbine and a bladed impeller in a toroidal fluid flow circuit adapted to establish a hydrokinetic torque flow path, said impeller being adapted to be connected to said engine;

multiple speed ratio gearing having a torque input element and a torque output element for driving said traction wheels;

an auxiliary gear unit having a torque input element connected to said turbine and a torque output element connected to said torque input element of said gearing and a reaction element;

brake means for anchoring said reaction element of said auxiliary gear unit; and lock-up clutch means for connecting said engine directly to said transmission torque input element thereby interrupting said torque flow path as said brake means is released whereby a speed ratio between two adjacent speed ratios of said gearing is effected.

2. A multiple speed ratio transmission for a vehicle with an engine and traction wheels comprising a hydrokinetic torque converter having a bladed turbine and a bladed impeller in a toroidal fluid circuit, an impeller housing enclosing said turbine, said torque converter impeller housing being adapted to be connected to said engine;

said transmission having multiple speed ratio gearing, a torque input element and a torque output element for driving said traction wheels;

an auxiliary gear unit adapted to provide an intermediate gear ratio between each gear ratio of said geared transmission, said auxiliary gear unit having a reaction element, torque input element connected to said turbine and a torque output element connected to said torque input element of said gearing; and lock-up clutch means in said impeller housing for connecting said impeller housing to said torque output element of said auxiliary gear unit;

said auxiliary gear unit, upon engagement and disengagement of said lock-up clutch means, proving a speed ratio between each of two adjacent speed ratios of said multiple ratio gearing.

3. A multiple ratio transmission as set forth in claim 2, wherein said lock-up clutch means is adapted to provide an automatic ratio downshift when said lock-up clutch is released and the converter functions as an open converter.

4. A multiple ratio transmission as set forth in claim 2, wherein said auxiliary gear unit includes an overrunning brake means for anchoring said reaction element during torque delivery through said auxiliary gear unit.

5. A multiple ratio transmission as set forth in claim 4, wherein said auxiliary gear unit includes friction brake means for anchoring said reaction element during coast braking when torque delivery through said auxiliary gear unit is reversed.

6. The combination as set forth in claim 4 wherein said auxiliary gear unit includes a ring gear connected to said turbine, said reaction element being a sun gear, planetary pinions engaging said sun and ring gears, a carrier journalling said pinions and forming a part of said torque output element of said auxiliary gear unit, a coast braking pinion carried by said carrier and engaging said sun and ring gears, and a one-way clutch connection between said carrier and said coast braking pinion.

7. A hydrokinetic, multiple speed ratio transmission for a vehicle with an engine and traction wheels comprising a hydrokinetic unit with a bladed turbine and a bladed impeller in a toroidal fluid flow circuit adapted to establish a hydrokinetic torque flow path, said impeller being adapted to be connected to said engine;

multiple speed ratio gearing having a torque input element and a torque output element for driving said traction wheels;

an auxiliary planetary gear unit comprising a ring gear connected to said turbine, a planet pinion carrier connected to said torque input member of said gearing and a reaction sun gear;

brake means for anchoring said reaction element of said auxiliary gear unit; and lock-up clutch means for connecting said engine directly to said transmission torque input element thereby interrupting said torque flow path as said brake means is released whereby a speed ratio between two adjacent speed ratios of said gearing is effected.

* * * * *